Jan. 23, 1962   G. A. KENNEDY   3,017,715
FISH CATCHER
Filed July 10, 1958

INVENTOR

George A. Kennedy 3,017,715
FISH CATCHER
George A. Kennedy, 1314 Michigan Ave.,
Gladstone, Mich.
Filed July 10, 1958, Ser. No. 747,637
1 Claim. (Cl. 43—16)

This invention relates to fishing apparatus and more particularly to an accessory therefor.

It is an object of the present invention to provide a device that will automatically jerk the line as soon as a fish bites upon the hook, thus assuring a better chance of catching the fish before it leaves the hook.

Another object of the present invention is to provide a fish catcher of the above type that has a signal device which will automatically indicate whether the device is still set for action or has already been actuated by a tug upon the fish hook.

Other objects of the invention are to provide a fish catcher bearing the above objects in mind which is of simple construction, has a minimum number of parts, is inexpensive to manufacture and efficient in operation.

Figure 1:
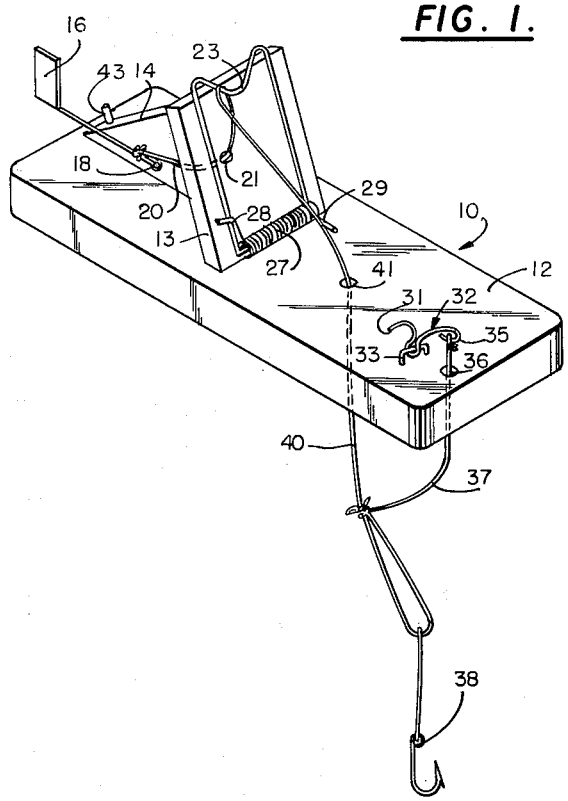
Figure 2:
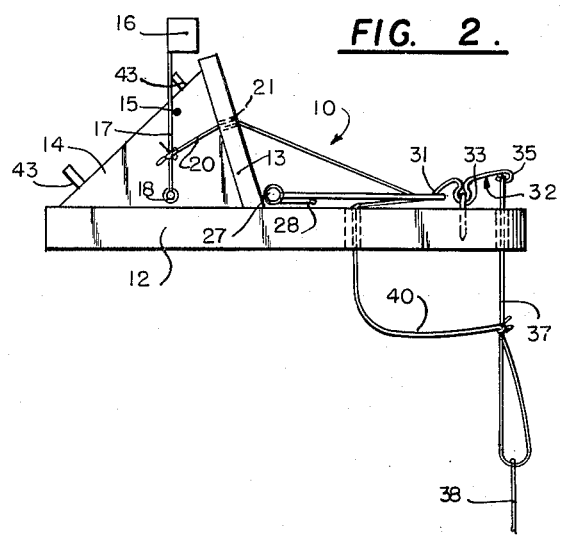

For other objects and for a better understanding of the invention, reference may be had to the following detailed description taken in conjunction with the accompanying drawing, in which:

FIGURE 1 is a perspective view of a fish catcher made in accordance with the present invention in a released position; and FIGURE 2 is a side elevational view of the device shown in FIGURE 1, showing the parts in the set position ready for use.

Referring now more in detail to the drawing, a fish catcher 10 made in accordance with the present invention is shown to include a rigid base 12 that can be mounted upon a boat, dock, or any other suitable surface in a simple and efficient manner. A plate 13 extends upwardly and rearwardly from the base 12 and is maintained in this position by means of a brace plate 14.

A flag 16 carried upon a staff 17 provides a signal for indicaitng the position of the mechanism. The staff 17 is pivotally supported upon the brace plate 14 by means of a pivot pin 18. A signal line 20 extends through a hole 21 in the angle plate 13 and is secured at one end to a mid section of the staff 17, and the opposite end thereof is secured to a wire frame 23. This frame is pivotally supported upon the base 12 by means of a torsion spring 27 which encircles it and has one end 28 in abutting engagement with a side thereof. The opposite end of the torsion spring is integrally secured to the base 12, so as to provide a pivot axis for rotation of the frame from an actuated horizontal position as shown in FIGURE 2 and an at rest position, shown in FIGURE 1. The actuating line 20 raises the flag staff 17 when the frame 23 is in the set position as shown in FIGURE 2, and the staff 17 falls by gravity to the lowered position shown in FIGURE 1 in response to the movement of the frame to the at rest position by the spring 27. A stop member 15 limits the upward movement of the staff 17 to a point just short of a vertical position so that it will fall to the lowered position as soon as the tension on the actuating line 20 is removed.

A releasable latch mechanism is provided for securing the ware frame 23 in the horizontal set position against the action of the torsion spring 27. This latch assembly include a lever 32 that is pivotally supported adjacent to its mid portion upon the base 12 by means of a bail 33. One end of the lever 32 is provided with a hook 31 that engages with the frame 23 and retains it in the set position. The frame 23 is bent or bowed inwardly at its upper end and the bowed end is located adjacent book 31 of the latch lever 32 to be retained thereby in the set position shown in FIG. 2. Since the hook end 31 of the latch lever 32 is without an arm or at least only a short effective arm, it is held tight under the tendency of the torsion spring 27 to elevate it. A portion of the bowed end of frame 23 is placed under the latch hook and adjacent the fulcrum point of the latch lever 32. The bent end of the frame also keeps the activator line looped thereover at the center point thereacross to provide at all times an even pull at the center of the outer end of the frame. The opposite end of the lever is provided with an eye 35 that overlies an opening 36 in the base 12, through which an operator line 37 extends. One end of this operator line is connected to the eye 35, while the opposite end thereof is connected to a fish hook 38. The main fish line 40 is also connected to the fish hook 38 that extends upwardly through an opening 41 in the base 12 into securing engagement with the wire frame 25. A pair of studs 43 carried upon the brace plate 14 provides means for accommodating excess fishing line during use.

In the operation of the present invention, the fish catcher is set by moving the parts to the position shown in FIGURE 2. In this position, the frame 23 is rotated to the horizontal position adjacent to the base 12 against the action of the spring 27 and secured therein by means of the engagement of the hook 31 therewith. In this position, the flag 16 is raised by the tension upon the line 20, there is slack in the main line 40, and the operator line 37 directly supports the fish hook 38. As soon as a fish pulls upon the fish hook 38, the operator line 37 transmits this movement to the eye 35 of the lever 32, thus rotating the hook 31 out of securing engagement with the frame 23, thus permitting it to rotate, as shown in dotted lines in FIG. 2, illustrated in FIGURE 1. During this movement, the movement of the frame exerts a jerk upon the hook 38 thus embedding it in the mouth of the fish, and releases the tension upon the actuating line 20 to allow the flag 16 to be dropped to the depressed position. This signals the operator that the device has been tripped. In the tripped position, the operator line 37 assumes a slack position and the main fish line 40 assumes a taut position. After the fish is removed from the hook 38, the device is reset for the next operation.

While various changes may be made in the detail construction, it shall be understood that such changes shall be within the spirit and scope of the present invention as defined by the appended claim.

What I claim as new and desire to protect by Letters Patent of the United States is:

A fish catcher comprising, a rigid base having a line hole extending through the center thereof, a wire frame being downwardly bowed at one end, spring means hingedly supporting said wire frame upon said base, a main line extending through said hole in the base, a fish hook connected to one end of said main line, the opposite end of said line being connected to said frame, said spring biasing said wire frame for rotation in a direction away from said rigid base, latch means releasably securing said frame in a position adjacent to said base against the action of said spring means, an operator line connected at one end to said fish hook and secured at the opposite end to said latch means for effecting release of said frame in response to a pull upon said hook, said rigid base includes an upwardly and rearwardly inclined plate defining an obtuse angle with said base, said wire frame being rotatable between an initial set position in substantially parallel engagement with said base and an extreme tripped position in substantially parallel engagement with said inclined plate, and an indicator arm pivoted upon said base in rear of said inclined plate and operable between raised and lowered positions, said inclined plate having a hole therethrough, an activator line being looped about the bowed frame end thereby to be maintained at the center of the frame end and extending through said hole in the inclined plate, said activator line being connected to said indicator arm thereby connecting the indicator arm and the wire frame and serving to hold the indicator arm in the raised position against gravity when the indicator arm and the wire frame are in the set position, said indicator arm falling by gravity as the frame is released and assumes the extreme trip position.

References Cited in the file of this patent

UNITED STATES PATENTS

| | | |
|---|---|---|
| 619,819 | Zack | Feb. 21, 1899 |
| 1,317,843 | Wehner et al. | Oct. 7, 1919 |
| 1,996,704 | Hawkinson | Apr. 2, 1935 |
| 2,573,357 | Ramirez | Oct. 30, 1951 |
| 2,653,405 | Monahan | Sept. 29, 1953 |
| 2,721,415 | Holmes | Oct. 25, 1955 |
| 2,783,574 | Bayes | Mar. 5, 1957 |

FOREIGN PATENTS

| | | |
|---|---|---|
| 19,535 | Great Britain | 1889 |
| 906,202 | France | May 7, 1945 |